United States Patent
Tomlin

(10) Patent No.: US 12,124,421 B2
(45) Date of Patent: Oct. 22, 2024

(54) SYSTEM AND METHOD FOR EFFICIENT EXPANSION OF KEY VALUE HASH TABLE

(71) Applicant: Kioxia Corporation, Tokyo (JP)

(72) Inventor: Andrew John Tomlin, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 392 days.

(21) Appl. No.: 17/025,926

(22) Filed: Sep. 18, 2020

(65) Prior Publication Data

US 2022/0092046 A1     Mar. 24, 2022

(51) Int. Cl.
*G06F 16/22* (2019.01)
*G06F 3/06* (2006.01)

(52) U.S. Cl.
CPC ........ *G06F 16/2255* (2019.01); *G06F 3/0608* (2013.01); *G06F 3/0659* (2013.01); *G06F 3/0679* (2013.01)

(58) Field of Classification Search
CPC .. G06F 16/2255; G06F 3/0608; G06F 3/0659; G06F 3/0679
See application file for complete search history.

(56) References Cited

U.S. PATENT DOCUMENTS

| | | | | |
|---|---|---|---|---|
| 6,570,877 B1* | 5/2003 | Kloth | ............... | H04L 45/00 370/392 |
| 6,611,894 B1* | 8/2003 | Onoo | ............... | G06F 12/0607 711/219 |
| 7,596,569 B2* | 9/2009 | Bacon | ............... | G06F 12/0253 711/170 |
| 8,356,021 B2* | 1/2013 | Williams | ............... | G06F 16/10 707/696 |
| 8,397,051 B2* | 3/2013 | Beaman | ............... | G06F 16/2255 711/216 |
| 8,788,788 B2* | 7/2014 | Colgrove | ............... | G06F 12/0802 711/206 |
| 8,806,175 B2* | 8/2014 | Beaman | ............... | G06F 16/2255 711/216 |

(Continued)

OTHER PUBLICATIONS

Pitchumani et al., "SMRDB: Key-Value Data Store for Shingled Magnetic Recording Disks", SYSTOR 2015 (Year: 2015).*

(Continued)

*Primary Examiner* — Anhtai V Tran
*Assistant Examiner* — Huen Wong
(74) *Attorney, Agent, or Firm* — Foley & Lardner LLP

(57) ABSTRACT

A device for managing key-value (KV) data in non-volatile memory, includes a controller and volatile memory storing a hash table. The controller generates a first key from a KV pair, reads a first entry of the hash table based on the first key, reads, based on the first entry, a first page including a set of KV hash entries each containing a location of the non-volatile memory, determine whether the number of entries of the first page reaches a predetermined number, and in response to determining that the number of entries of the first page reaches the predetermined number, store KV data corresponding to the KV pair in a location of the non-volatile memory, write a KV hash entry containing the location of the non-volatile memory, and write a location of the KV hash entry in a second entry of the hash table.

20 Claims, 12 Drawing Sheets

(56) References Cited

U.S. PATENT DOCUMENTS

| | | | | |
|---|---|---|---|---|
| 8,819,375 | B1* | 8/2014 | Pruett | G06F 13/28 707/693 |
| 9,075,710 | B2* | 7/2015 | Talagala | G06F 12/0246 |
| 9,659,048 | B2* | 5/2017 | Ding | G06F 16/2272 |
| 10,255,309 | B2* | 4/2019 | Blanco | G06F 16/221 |
| 10,331,641 | B2* | 6/2019 | Zhang | G06F 16/9024 |
| 10,706,101 | B2* | 7/2020 | Breslow | G06F 16/9014 |
| 10,838,984 | B2* | 11/2020 | Zhicharevich | G06F 16/2272 |
| 10,891,264 | B2* | 1/2021 | Wang | H04L 67/568 |
| 11,474,699 | B1* | 10/2022 | Saha | G06F 3/0679 |
| 2003/0204698 | A1* | 10/2003 | Sachedina | G06F 12/0806 711/170 |
| 2004/0025142 | A1* | 2/2004 | Mandal | G06F 9/4488 717/104 |
| 2010/0257181 | A1* | 10/2010 | Zhou | G06F 16/2272 711/170 |
| 2011/0276744 | A1* | 11/2011 | Sengupta | G06F 12/0246 711/216 |
| 2013/0042060 | A1* | 2/2013 | Marukame | G06F 16/137 711/108 |
| 2013/0250686 | A1* | 9/2013 | Marukame | G06F 3/0644 365/185.11 |
| 2013/0268770 | A1* | 10/2013 | Hunt | G06F 16/2255 713/189 |
| 2013/0282964 | A1* | 10/2013 | Sengupta | G11C 7/1072 711/104 |
| 2014/0081918 | A1* | 3/2014 | Srivas | G06F 16/1727 707/639 |
| 2014/0195720 | A1* | 7/2014 | Akella | G06F 12/0246 711/103 |
| 2015/0127658 | A1* | 5/2015 | Ding | G06F 16/2255 707/747 |
| 2016/0034693 | A1* | 2/2016 | Takeuchi | G06F 21/604 713/189 |
| 2016/0048333 | A1* | 2/2016 | Zheng | G06F 3/061 711/103 |
| 2016/0267490 | A1* | 9/2016 | Johnson | G07C 13/00 |
| 2016/0357743 | A1* | 12/2016 | Swaminathan | G06F 16/182 |
| 2017/0255709 | A1* | 9/2017 | Cho | G06F 16/2255 |
| 2017/0277438 | A1* | 9/2017 | Gole | G06F 3/0689 |
| 2017/0286313 | A1* | 10/2017 | Jiang | G06F 12/0864 |
| 2017/0316028 | A1* | 11/2017 | Kanteti | G06F 3/067 |
| 2017/0351543 | A1* | 12/2017 | Kimura | G06F 16/2365 |
| 2017/0371912 | A1* | 12/2017 | Kimura | G06F 16/2365 |
| 2018/0011852 | A1* | 1/2018 | Bennett | G06F 16/2228 |
| 2018/0081897 | A1* | 3/2018 | Jiang | G06F 16/2255 |
| 2018/0217777 | A1* | 8/2018 | Jiang | G06F 3/0608 |
| 2018/0307620 | A1* | 10/2018 | Zhou | G06F 12/0246 |
| 2019/0005079 | A1* | 1/2019 | Li | G06F 16/2272 |
| 2019/0138612 | A1* | 5/2019 | Jeon | G06F 16/27 |
| 2019/0258729 | A1* | 8/2019 | Jeon | G06F 3/0679 |
| 2020/0034440 | A1* | 1/2020 | Schneider | G06F 16/2255 |
| 2020/0104047 | A1* | 4/2020 | Subbarao | G06F 3/064 |
| 2020/0134100 | A1* | 4/2020 | Wils | G06F 16/9027 |
| 2020/0183859 | A1* | 6/2020 | Johns | H04L 67/1097 |
| 2021/0089220 | A1* | 3/2021 | Gkoulalas-Divanis | G06F 21/6245 |
| 2022/0035788 | A1* | 2/2022 | Aharoni | G06F 16/908 |
| 2022/0171748 | A1* | 6/2022 | Bamel | G06F 11/1464 |

OTHER PUBLICATIONS

Debnath et al., "ChunkStash: Speeding up Inline Storage Deduplication using Flash Memory", Microsoft Research (Year: 2010).*

Lim et al., "SILT: a memory-efficient, high-performance key-value store", ACM (Year: 2011).*

Debnath et al., "FlashStore: High Throughput Persistent Key-Value Store", ACM (Year: 2010).*

Shen et al., "Optimizing Flash-based Key-value Cache Systems", Department of Computing Hong Kong Polytechnic University (Year: 2016).*

Lloyd et al., "Near Memory Key/Value Lookup Acceleration", ACM (Year: 2017).*

Lu et al., "BloomStore: Bloom-Filter based Memory-efficient Key-Value Store for Indexing of Data Deduplication on Flash", IEEE (Year: 2012).*

Microsoft Corporation, "Microsoft Computer Dictionary", Microsoft Corporation (Year: 2002).*

* cited by examiner

```
typedef unsigned long uint32_t;
typedef unsigned long long uint64_t;
#define MAP_REDIRECT_ADDR (((1<<32)-(1<<26)-(1<<20)))
#define MD_MAP_POWER2 (1<<30)
#define MD_MAP_EXTRA (1<<27)

uint32_t MDMap[MD_MAP_POWER2+MD_MAP_EXTRA];

uint32_t getFlashAddress(uint64_t UpperKey)
{
    int UpperKeyIndexLen = 30;
    uint32_t myAddress = MDMap[UpperKey & ((1<<UpperKeyIndexLen)-1)]; //get value from power of 2 space
    while (myAddress > MAP_REDIRECT_ADDR) { //check if we need to indirect
        myAddress = MDMap[ MD_MAP_POWER2 + //start with offset into extra area
            (myAddress-MAP_REDIRECT_ADDR)*2 + //get redirect offset, *2 as two entries
            ((UpperKey>>UpperKeyIndexLen) & 1)]; //pick which of the two redirect entries
        UpperKeyIndexLen++; // incase first redirect didn't cut it
    }
    return (myAddress);
}
```

FIG. 6A

SYSTEM AND METHOD FOR EFFICIENT EXPANSION OF KEY VALUE HASH TABLE

TECHNICAL FIELD

The present embodiments relate generally to system and method for operating a key-value data storage device, and more particularly to system and method for managing key-value data in a data storage device using a key-value hash table without doubling the hash table.

BACKGROUND

Key-value storage devices use input user keys to identify data blocks via key-to-physical address mapping. A hash table can be used for such address mapping. The hash table may be maintained in a local memory, such as a volatile dynamic random access memory (DRAM). Given a limited capacity of DRAM, improvements in efficient management of a hash table remain desired.

SUMMARY

The present embodiments relate to system and method for managing key-value data in a data storage device and expanding the key space of a key-value hash table without doubling the size of the hash table.

According to certain aspects, embodiments provide a device for managing key-value (KV) data in non-volatile memory including a controller and volatile memory storing a hash table. The controller may be configured to generate a first key from a key-value (KV) pair. The controller may be configured to read, based on the first key, a first entry of the hash table. The controller may be configured to read, based on the first entry of the hash table, a first page including a set of KV hash entries each containing a location of the non-volatile memory. The controller may be configured to determine whether the number of entries of the first page reaches a predetermined number. The controller may be configured to, in response to determining that the number of entries of the first page reaches the predetermined number, store KV data corresponding to the KV pair in a first location of the non-volatile memory, write a first KV hash entry containing the first location of the non-volatile memory, and write a location of the first KV hash entry in a second entry of the hash table. The controller may be configured to, in response to determining that the number of entries of the first page does not reach the predetermined number, store KV data corresponding to the KV pair in a second location of the non-volatile memory, and add to the first page a new KV hash entry containing the second location of the non-volatile memory. In some embodiments, each of the first entry and the second entry of the hash table may contain a location of the non-volatile memory.

According to other aspects, embodiments provide a method of managing key-value (KV) data in non-volatile memory. The method may include generating, by a processor, a first key from a key-value (KV) pair. The method may include reading, by the processor based on the first key, a first entry of a hash table stored in volatile memory. The method may include reading, by the processor based on the first entry of the hash table, a first page including a set of KV hash entries each containing a location of non-volatile memory. The method may include determining, by the processor, whether the number of entries of the first page reaches a predetermined number. The method may include in response to determining that the number of entries of the first page reaches the predetermined number, storing, by the processor, KV data corresponding to the KV pair in a first location of the non-volatile memory, writing a first KV hash entry containing the first location of the non-volatile memory, and writing a location of the first KV hash entry in a second entry of the hash table. The method may include in response to determining that the number of entries of the first page does not reach the predetermined number, storing, by the processor, KV data corresponding to the KV pair in a second location of the non-volatile memory, and adding to the first page a new KV hash entry containing the second location of the non-volatile memory. In some embodiments, each of the first entry and the second entry of the hash table contains a location of the non-volatile memory.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 6A illustrates an example pseudo code for calculating a redirected address using a hash table, according to some embodiments;

DETAILED DESCRIPTION

According to certain aspects, embodiments in the present disclosure relate to techniques for managing key-value data in a data storage device and expanding the key space of a key-value hash table without doubling the size of the hash table.

Conventional hash tables are generally power of two (2) sized. This may create memory challenges for very large hash tables. Typically various metrics are used to determine when to double the table size of a hash table. There are many different key-value (KV) designs which utilize a hash table in some form. In a flash based native KV-FTL (Key-Value Flash Translation Layer), there is a problem that resources on SSD (Solid State Drives) are limited and at some point the hash table size can no longer be doubled.

For example, a fixed length key may be generated from a user key (using a hash function) and used to describe a key-value pair. A key may be variably split into an upper key or index (e.g., an index to a hash table) and a lower key or remainder. A hash table (an array of hash buckets) may be indexed using this upper key. In some embodiments, a metadata page may be a bucket of a hash table. Each entry of the hash table may point to a flash location for a metadata page that contains a table of entries. Initially there may be only one metadata page (initial metadata page), and as a result the entire keys may be contained in the metadata page. As additional key-values are written, the initial page may be eventually split into two (2) where the least significant bit (LSB) of an upper key denotes which page the corresponding entry goes into. That 1 bit may be no longer stored within the table. As time goes on, the metadata pages may split again and again with more bits used as an index. In an extreme case, the size of the hash table may become a limitation and the ability to simply double the size of the hash table may become a problem.

Figure 1:
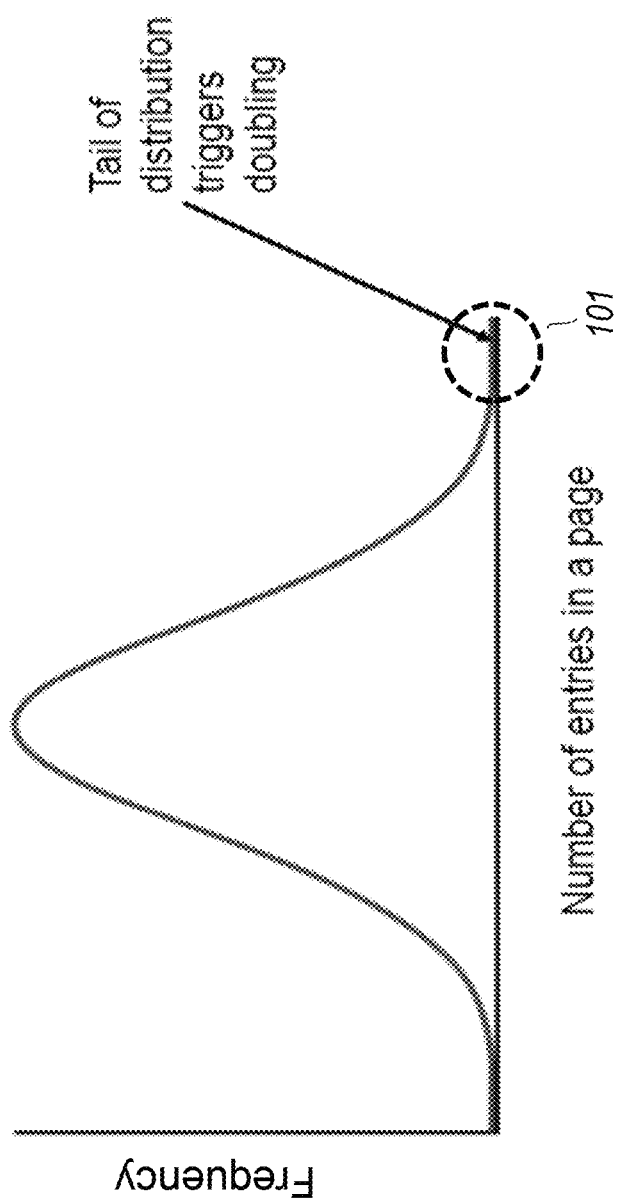
FIG. 1 illustrates a distribution of number of entries in a page (or bucket) of a hash table (e.g., metadata map) according to some embodiments.

FIG. 1 illustrates a distribution of the frequency of occurrence of the number of entries in a page (or bucket) of a hash table (e.g., metadata map) according to some embodiments. Assuming a good hash function, the number of entries in a page can have a normal distribution. For example, in most cases, the number of entries in a metadata page does not exceed a page limit as shown in FIG. 1. However, at the limit, e.g., when the number of entries in a metadata page reaches to the page limit, it may take only one entry to exceed the page limit to force a doubling of the hash table. In other words, a tail of distributions of the number of entries (e.g., portion 101 in FIG. 1) may trigger a doubling of the whole hash table. To avoid this problem, more DRAM may be added and/or secondary data structures may be added. However, secondary data structures would likely either reduce performance or restrict the number of objects for a given DRAM capacity.

To solve this problem, according to certain aspects, embodiments in the present disclosure relate to techniques for using an address redirection to extend a hash table (e.g., a metadata map) by a small percentage beyond the size limit of a given power of 2 to avoid the table doubling in size according to prior solutions when reaching the size limit. In some embodiments, it can be guaranteed that a value can be retrieved in two (2) DRAM reads and one (1) Flash read, and worst case buckets can be prevented from limiting an average KV capacity. In some embodiments, an address redirection can be used for small percentage of buckets to allow O(2) complexity (e.g., 2 DRAM reads and 1 Flash reads) for those buckets while retaining O(1) (e.g., 1 DRAM read and 1 Flash read) for remainder, thus allowing the hash table to have significantly more capacity without doubling resources.

In some embodiments, a key-value storage system may include a metadata map as a KV hash table. Each entry of the metadata map may point to a flash location for a metadata page that contains a table of KV hash entries. The metadata map may be stored in memory (e.g., DRAM). The KV hash table may initially have all keys fit into an initial metadata page (page 0). Once the initial metadata page fills, it may be split into two based on the least significant bit (LSB) in an upper key so that there are two (2) metadata pages—the initial metadata page and a first metadata page (page 0 and page 1) and the length of an upper key index equals one (upper key index length=1). When either of the two metadata pages fills up, the page filling up may be split. For example, if page 1 fills up, page 1 may be split into page 1 and page 3 so that the length of an upper key index equals two (upper key index length=2). If an attempt is made to read page 2, which does not exist yet, a lookup into the metadata map may return an invalid location (e.g., address 0, or some other reserved or unused value). If this happens then read may be attempted to page 0 which will succeed. This hash table splitting (or growth) process may continue as necessary as more objects or entries are written. In some embodiments, this splitting (or growth) process may be implemented by causing a processor (e.g., CPU) to execute program instructions. In some embodiments, this splitting (or growth) process may be implemented in hardware or firmware.

In some embodiments, the metadata map may have an extra overflow area outside an area of power of two (e.g., $2^{30}$) to allow overflow of the KV hash table. In some embodiments, the address space defined by entries of the metadata map may include a cache address space, a redirection address space, and a flash address space. In some embodiments, an address in the power of two area of the metadata map may be treated as an indirection value pointing to the start of the redirection address space and an offset value from the start of the redirection address space (instead of pointing to an address in the flash space). The value found at the offset address may be used as a reference to two (2) entries in the overflow area of the metadata map. A redirected address in the flash address space may be determined based on the two entries in the overflow area of the metadata map. In some embodiments, cache can be managed in a similar manner.

According to certain aspects, embodiments in the present disclosure relate to a device for managing key-value (KV) data in non-volatile memory including a controller and volatile memory storing a hash table. The controller may be configured to generate a first key from a key-value (KV) pair. The controller may be configured to read, based on the first key, a first entry of the hash table. The controller may be configured to read, based on the first entry of the hash table, a first page including a set of KV hash entries each containing a location of the non-volatile memory. The controller may be configured to determine whether the number of entries of the first page reaches a predetermined number. The controller may be configured to, in response to determining that the number of entries of the first page reaches the predetermined number, store KV data corresponding to the KV pair in a first location of the non-volatile memory, write a first KV hash entry containing the first location of the non-volatile memory, and write a location of the first KV hash entry in a second entry of the hash table. The controller may be configured to, in response to determining that the number of entries of the first page does not reach the predetermined number, store KV data corresponding to the KV pair in a second location of the non-volatile memory, and add to the first page a new KV hash entry containing the second location of the non-volatile memory. In some embodiments, each of the first entry and the second entry of the hash table may contain a location of the non-volatile memory.

According to certain aspects, embodiments in the present disclosure relate to a method of managing key-value (KV) data in non-volatile memory. The method may include generating, by a processor, a first key from a key-value (KV) pair. The method may include reading, by the processor based on the first key, a first entry of a hash table stored in volatile memory. The method may include reading, by the processor based on the first entry of the hash table, a first page including a set of KV hash entries each containing a location of non-volatile memory. The method may include determining, by the processor, whether the number of entries of the first page reaches a predetermined number. The method may include in response to determining that the number of entries of the first page reaches the predetermined number, storing, by the processor, KV data corresponding to the KV pair in a first location of the non-volatile memory, writing a first KV hash entry containing the first location of the non-volatile memory, and writing a location of the first KV hash entry in a second entry of the hash table. The method may include in response to determining that the number of entries of the first page does not reach the predetermined number, storing, by the processor, KV data corresponding to the KV pair in a second location of the non-volatile memory, and adding to the first page a new KV hash entry containing the second location of the non-volatile memory. In some embodiments, each of the first entry and the second entry of the hash table contains a location of the non-volatile memory.

Embodiments in the present disclosure have at least the following advantages and benefits.

Embodiments in the present disclosure can provide useful techniques for preventing a hash table (e.g., metadata map) from growing when the initial metadata page exceeds its limit as the number of keys in a metadata page is not uniform. For example, an extra overflow area of the metadata map outside an area of power of two may be used to avoid doubling the size of the metadata map for every additional bit of the upper key encoded. These techniques can enable a hash table to have increased capacity without doubling resources. These techniques can enable higher number of keys to be stored for the minimal increased resource cost, as well as increasing overall efficiency of resources used, thus increasing the value of solution to customers.

Figure 2:
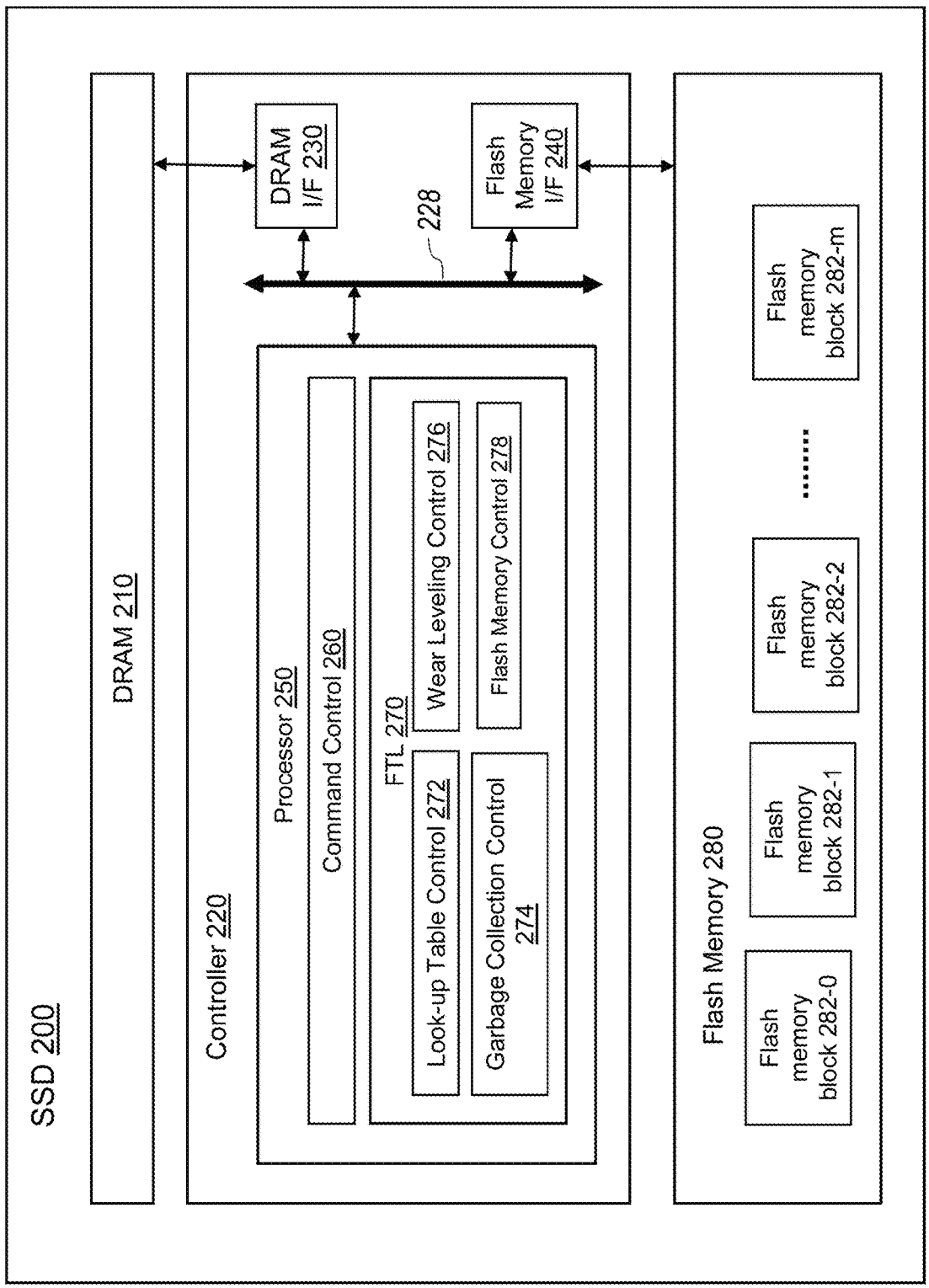
FIG. 2 is a block diagram illustrating an example flash memory system according to some embodiments.

FIG. 2 is a block diagram illustrating an example flash memory system according to some embodiments.

Referring to FIG. 2, a flash memory system may include a solid-state drive (SSD) 200, which is a storage device and may be used as a main storage of an information processing apparatus (e.g., a host computer). The SSD 200 may be incorporated in the information processing apparatus or may be connected to the information processing apparatus via a cable or a network. The SSD 200 includes, for example, a controller 220 and a flash memory 280 as non-volatile memory (e.g., a NAND type flash memory). The SSD 200 may include a random access memory which is a volatile memory, for example, DRAM (Dynamic Random Access Memory) 210. In some embodiments, the controller 220 may include a random access memory such as SRAM (Static Random Access Memory). The random access memory such as the DRAM 210 has, for example, a read buffer which is a buffer area for temporarily storing data read out from the flash memory 280, a write buffer which is a buffer area for temporarily storing data written in the flash memory 280, and a buffer used for a garbage collection. In some embodiments, the controller 220 may include the DRAM 210.

In some embodiments, the flash memory 280 may include a memory cell array which includes a plurality of flash memory blocks (e.g., NAND blocks) 282-1 to 282-*m*. Each of the blocks 282-1 to 282- may function as an erase unit. Each of the blocks 282-1 to 282-*m* includes a plurality of physical pages. In some embodiments, in the flash memory 280, data reading and data writing are executed on a page basis, and data erasing is executed on a block basis.

In some embodiments, the controller 220 may be a memory controller configured to control the flash memory 280. The controller 220 includes, for example, a processor (e.g., CPU) 250, a flash memory interface 240, and a DRAM interface 230, all of which may be interconnected via a bus 228. The DRAM interface 230 may function as a DRAM controller configured to control an access to the DRAM 210. The flash memory interface 240 may function as a flash memory control circuit (e.g., NAND control circuit) configured to control the flash memory 280 (e.g., NAND type flash memory).

The processor 250 may be configured to control the flash memory interface 240, and the DRAM interface 230. The processor 250 may be configured to perform various processes by executing a control program (e.g., firmware) stored in, for example, a ROM (not shown). In some embodiments, the processor 250 may perform a command control 260 to execute command processing for processing various commands received from an information processing apparatus (e.g., a host computer).

The processor 250 may be configured to function as a flash translation layer (FTL) 270 to execute data management and block management of the flash memory 280. The FTL 270 may include a look-up table control 272, a garbage collection control 274, a wear leveling control 276, and a flash memory control 278. The data management may include management of mapping information indicating a correspondence relationship between a user key and a physical address of the flash memory 280. In some embodiments, the look-up table control 272 may execute management of mapping between each logical block address (LBA) or user key and each physical address using an address translation table (logical/physical address translation table). The look-up table control 272 may execute hashing of user keys to index a hash table (e.g., a metadata map 330 in FIG. 3A) to manage key-value data. The garbage collection control unit 274 may execute garbage collection (GC) which is a process executed to generate a free block as a data write destination block. The wear leveling control 276 may executes wear leveling which is a process of leveling the number of times of block erasure so that by preventing an occurrence of blocks with a larger number of erasures, the failure probability of the SSD 3 can be reduced. The flash memory control unit 278 may execute control of the flash memory interface 240.

Figure 3A:
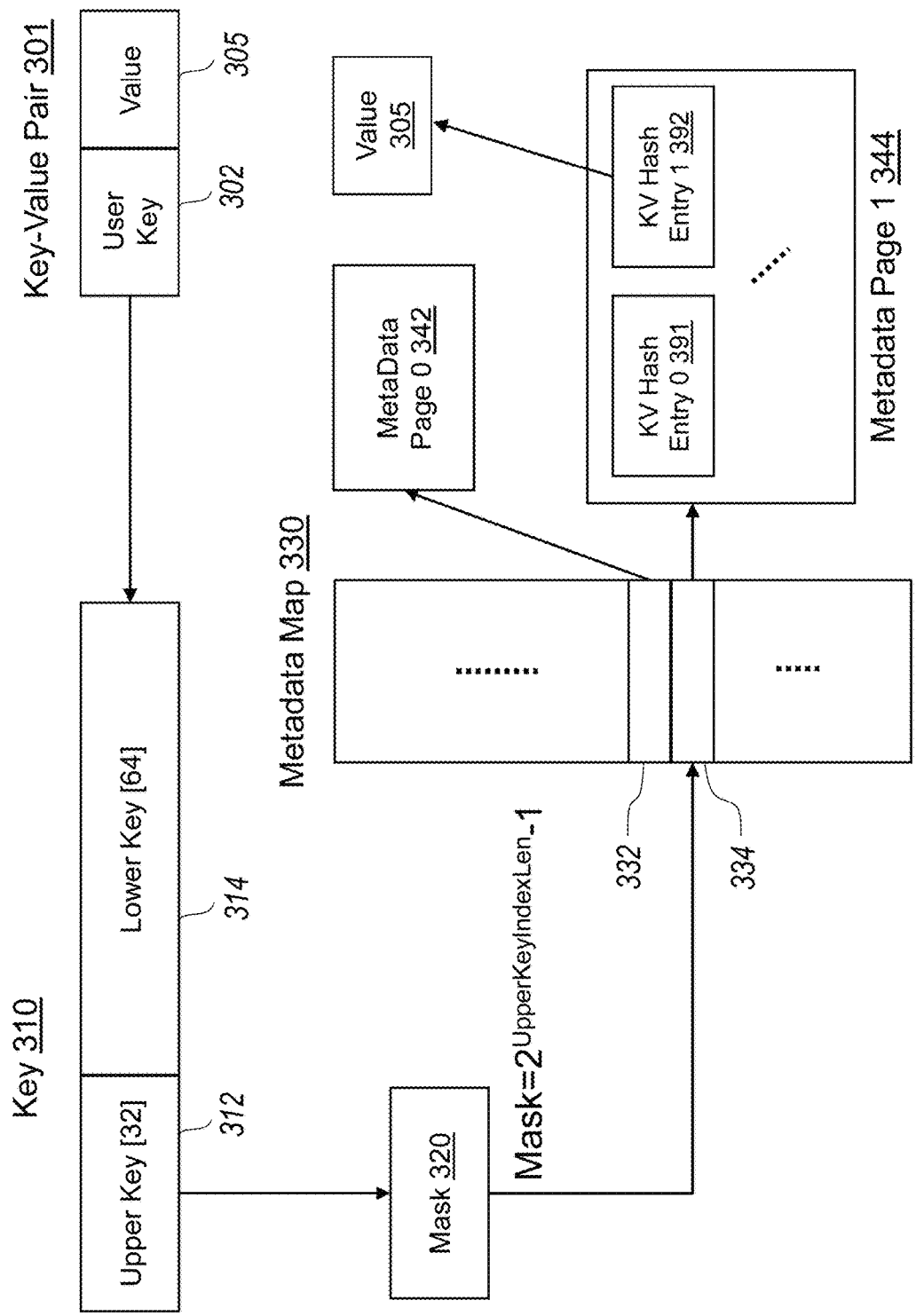
FIG. 3A and FIG. 3B are block diagrams illustrating an example key to flash memory mapping arrangement using a hash table, according to some embodiments.
Figure 3B:
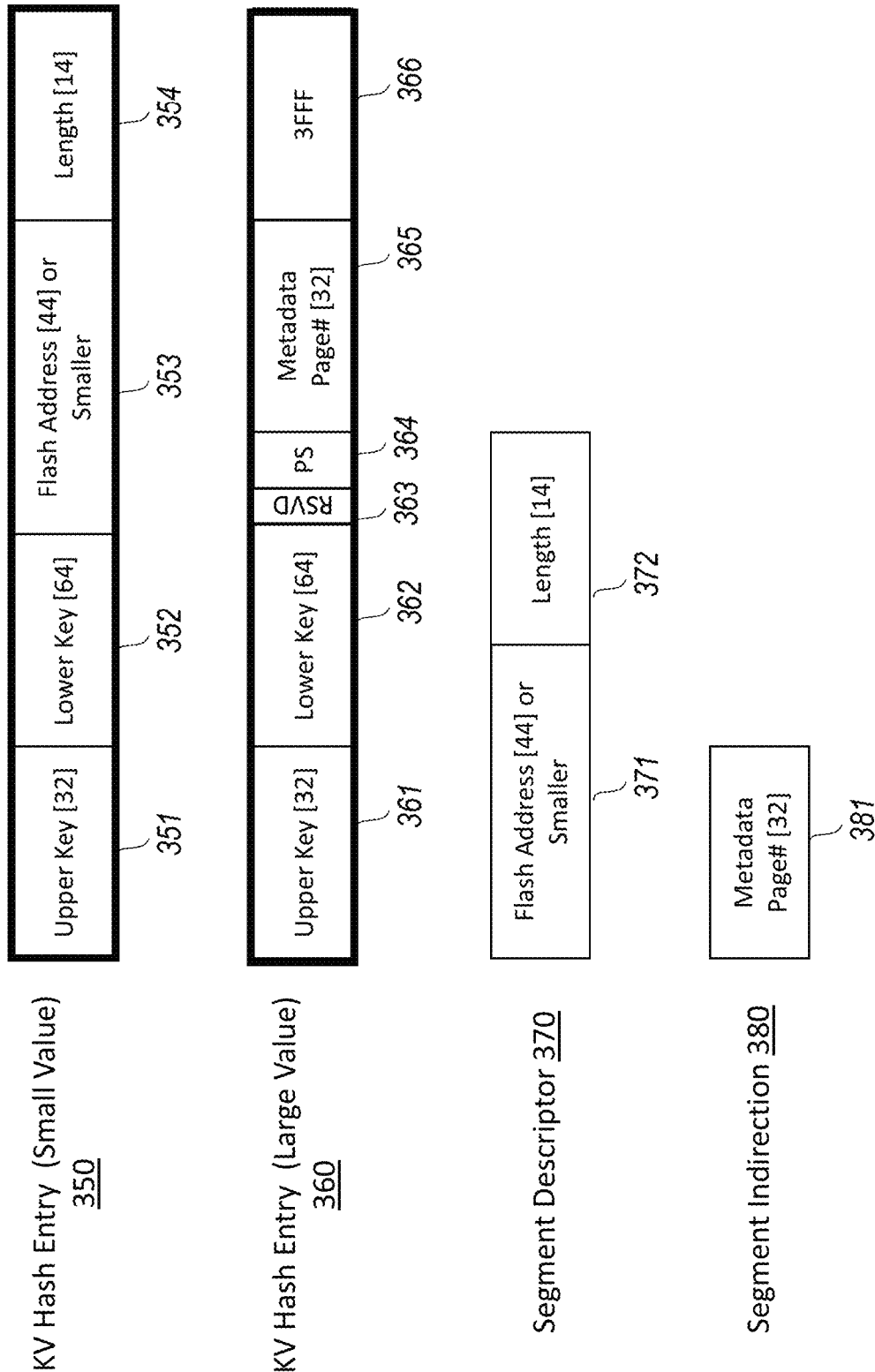

FIG. 3A and FIG. 3B are block diagrams illustrating an example flash memory system using a hash table, according to some embodiments.

Referring to FIG. 3A, a processor of a flash memory system (e.g., the processor 250 in FIG. 2) may generate a fixed length key 310 from a variable length user key 302 of a key-value pair 301 including the user key 302 and the corresponding value 305 (which is not part of a hash value). A hash function (not shown) may be used to generate the fixed length key 310 from the variable length user key 302. The key 310 may be used to as a reference for the key-value pair 301. The fixed length key 310 may be variably split into an upper key or index 312 (e.g., an index to a hash table) and a lower key or remainder 314. A hash table (an array of hash buckets) may be indexed using this upper key. For example, the 32 bit upper key 312 may be masked by a mask 320 to generate an index to a hash table (e.g., the metadata map 330 in FIG. 3A). In some embodiments, the mask may be defined using a value of upper key index length (UpperKeyIndexLen) as follows:

$$\text{Mask}=2^{UpperKeyIndexLen}-1 \qquad \text{(Equation 1)}$$

In some embodiments, the metadata map 330 may be stored in memory (e.g., DRAM 210 in FIG. 2). The metadata map 330 includes a plurality of map entries. In some embodiments, each entry is 4 byte (B) long to describe a location of non-volatile memory (e.g., flash memory 280 in FIG. 2) for a metadata page or in memory cache location. For example, in FIG. 3A, an index to an entry 334 may be generated by masking the upper key 312 by the mask 320, and the entry 334 may contain a 4 byte address of non-volatile memory indicating a location of a metadata page 1 (344). Similarly, an entry 332 may contain a 4 byte address of non-volatile memory indicating a location of a metadata page 0 (342). Assuming 1 KB size per metadata page, 4 byte address contained in a metadata map entry can define an address space of $2^{32}$ which is equivalent to 4 TB of metadata in flash memory. However, as this address space may also include overprovisioning, more practically 2 TB of metadata could be stored. For example, 2 TB of metadata would likely be necessary to store 128 TB of user key value pairs.

In some embodiments, a metadata page (e.g., pages 342 and 344 in FIG. 3A) may be a bucket of a hash table (e.g., the metadata map 330). A metadata page may contain a table of KV hash entries each of which may contain an address of non-volatile memory address indicating a location of a value corresponding to a key. For example, the metadata page 1 (344) may contain a KV hash entry 0 (391), a KV hash entry 1 (392), etc, and the KV hash entry 392 may contain an address and length of the value 305 stored in the non-volatile memory.

Referring to FIG. 3B, a KV hash entry may be a KV hash entry 350 for small values or a KV hash entry 360 for large values. The KV hash entry 350 for small values may include remaining unmasked bits of the 32 bit upper key 351, a 64 bit lower key 352, a flash address 353 having 44 bits or smaller, and a 14 bit length 354. The KV hash entry 360 for large values may include remaining unmasked bits of the 32 bit upper key 361, a 64 bit lower key 362, a reserved (RSVD) field 363, a 3 bit page size (PS) 364, a 32 bit metadata page number 365, and a predefined constant 366 (e.g., "3FFF"). In some embodiments, three (3) bits of the page size (PS) 364 may contain values of 0, 1, 2, 3, 4 to indicate the page size of 4 KB, 8 KB, 16 KB, 32 KB, 64 KB, respectively. In some embodiments, a metadata page may contain a segment descriptor 370 or a segment indirection 380 for large values. The segment descriptor 370 may include a flash address 371 having 44 bits or smaller, and a 14 bit length 372. The segment indirection 380 for large values may include a 32 bit metadata page number 381. In some embodiments, all data in metadata pages may be bit packed.

In some embodiments, a key-value storage system (e.g., SSD 200 in FIG. 2) may include a metadata map (e.g., metadata map 330) as a KV hash table. The KV hash table may initially have all keys fit into an initial metadata page (e.g., metadata page 0 (342) in FIG. 3A). Once the initial metadata page fills, it may be split into two based on the least significant bit (LSB) in an upper key so that there are two (2) metadata pages—the initial metadata page and a first metadata page (e.g., page 0 (342) and page 1 (344) in FIG. 3A) and the length of an upper key index (UpperKeyIndexLen) equals one (UpperKeyIndexLen=1). When either of the two metadata pages fills up, the page filling up may be split. For example, if page 1 fills up, page 1 may be split into page 1 and page 3 so that the length of an upper key index equals two (UpperKeyIndexLen=2). If an attempt is made to read page 2, which does not exist yet, a lookup into the metadata map may return an invalid location (e.g., address 0). If this happens then read may be attempted to page 0 which will succeed. This hash table splitting (or growth) process may continue as necessary as more objects or entries are written. As time goes on, the metadata pages may split again and again with more bits used as an index. In an extreme case, the size of the hash table may become a limitation and the ability to simply double the size of the hash table may become a problem. For example, if the size of the metadata map 330 is limited to a size smaller than that of $2^{31}$ entries, the system cannot double the size of the metadata map when UpperKeyIndexLen=30.

Figure 4:
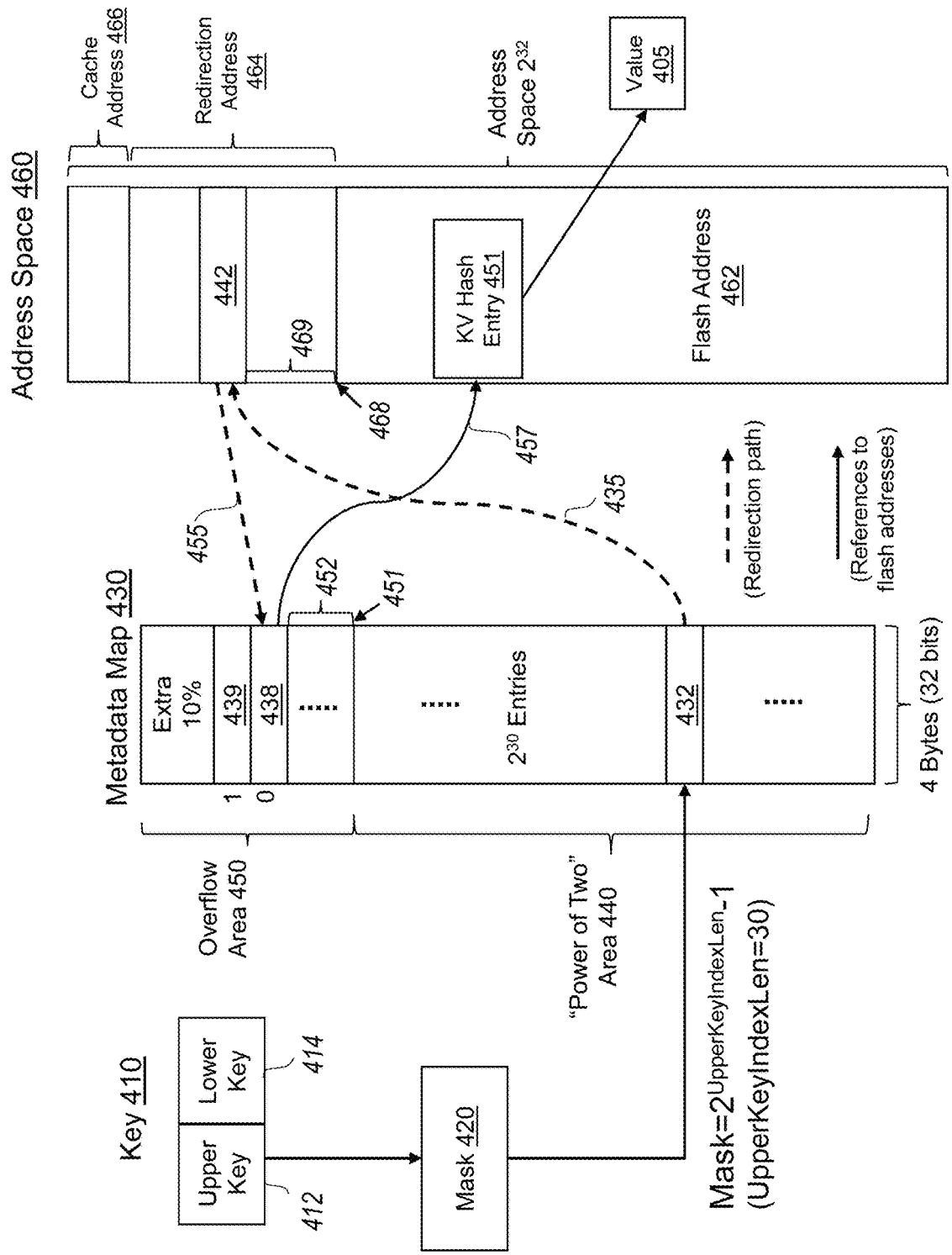
FIG. 4 illustrates an example process of performing a redirection in a hash table, according to some embodiments.

FIG. 4 illustrates an example process of performing a redirection in a hash table, according to some embodiments.

To solve the problem of doubling the size of metadata map, in some embodiments, an address redirection may be used to extend a hash table (e.g., a metadata map) by a small percentage beyond the size of power of two (2) to prevent the table doubling at the limit, e.g., when the number of entries in a metadata page reaches to a page limit. In some embodiments, this doubling point is defined by this tail of distributions of the number of entries (e.g., portion 101 in FIG. 1) as only one page exceeding the limit, and needing to be split causes a doubling of the metadata map size.

Referring to FIG. 4, in some embodiments, a metadata map 430 as a KV hash table may have an extra overflow area 450 outside an area of power of two 440 to allow overflow of the KV hash table. For example, the size of the area of power of two 440 may be $2^{30}$ and the size of the extra overflow area 450 may be 10% of the size of the area of power of two, e.g., $1.3*2^{26}$. In some embodiments, assuming 4 byte (B) size per map entry, an address space 460 defined by entries of the metadata map 430 may have size of $2^{32}$ (pages). The address space 460 may include a flash address space 462, a redirection address space 464, and an in-memory cache address space 466. For example, if the cache address space 466 has size of $2^{20}$ (equivalent to 1 GB with 1K pages) and the redirection address space 464 has size of $2^{27}$ entries, and metadata page size is 1K, the flash address space for the metadata will have size of $(2^{32}-2^{27}-2^{20})*1K$ which is equivalent to 3.874 TB.

Referring to FIG. 4, in some embodiments, a fixed length key 410 may be generated from a user key corresponding to a value 405, and may be variably split into an upper key 412 and a lower key 414, for example the size of the upper key 412 may be chosen and the size of the lower key is the fixed length of key 410 minus the size of the upper key 412. The 32 bit upper key 412 may be masked by a mask 420 to generate an index to an entry 432 of the metadata map 430. The entry 432 may contain a 4 byte address 442 indicating an address of the redirection space 464 (instead of indicating a location of a metadata page in the flash address space 462) so as to perform a redirection 435. The address 442 contained in the entry 432 of the power of two area 440 of the metadata map may be treated as an indirection value 468 pointing to a start address of the redirection address space 464 and an offset 469 from the start of the redirection address space 464 (instead of pointing to an address in the flash address space 462). The offset 469 may be used to determine a reference 455 (e.g., index of the metadata map 430) to two (2) entries 438, 439 in the overflow area 450 of the metadata map. In some embodiments, the reference 455 may be determined by calculating an offset 452 from a start address 451 of the overflow area 450 based on the offset 469. For example, the offset 452 may be a multiple (for example two times) of the offset 469. The key-value storage system may determine whether the address 457 contained in the entry 438 is within the redirection address space 464. If the address 457 contained in the entry 438 is not within the redirection address space 464 and is within the flash address space 462, the key-value storage system may read a metadata page or a KV hash entry at the address 457. For example, as shown in FIG. 4, the key-value storage system may read a KV hash entry 451 containing an address of the value 405 stored in the non-volatile memory, and further read the value 405 at the address.

If the address contained in the entry 438 is within the redirection address space 464, the key-value storage system may increase the length of an upper key index (UpperKeyIndexLen) so as to read the other of the two entries, e.g., the entry 439. In other words, a redirection reference (e.g., the reference 455) may point to two entries 438, 439 of the metadata map 430, and the next key bit of the key 410 may be used (by increasing UpperKeyIndexLen) to decide which entry of the two entries to use. In this manner, a redirected address in the flash address space (e.g., the address 457) may be determined based on the two entries in the metadata map. In some embodiments, cache can be managed using redirection in a similar manner.

As shown in FIG. 4, embodiments of the present disclosure may use an address redirection to extend a hash table (e.g., the metadata map 430) by a small percentage (e.g., 10%) beyond the size of power of two area (the area 440) to prevent the table doubling at the limit, e.g., when the number of entries in a metadata page reaches to a page limit. In some embodiments, given a user key of a key-value pair, it can be guaranteed that a value can be retrieved in two (2) DRAM reads (e.g., two reads of two entries from the metadata map), and worst case buckets can be prevented from limiting an average KV capacity. In other words, an address redirection can be used for small percentage of buckets to allow O(2) complexity for those buckets while retaining O(1) for remainder, thus allowing the hash table to have increased capacity without doubling resources. In some embodiments, the size of the redirection address space 464 determines the number of entries (buckets) in the power of two area 440 that can use address redirection.

In some embodiments, a device (e.g., SSD 200 in FIG. 2) for managing key-value (KV) data in non-volatile memory (e.g., flash memory 280 in FIG. 2) may include a controller (e.g., controller 220 in FIG. 2) and volatile memory (e.g., DRAM 210 in FIG. 2) storing a hash table (e.g., metadata map 330, 430 in FIGS. 3A and 4). The controller may be configured to generate a first key (e.g., key 310 in FIG. 3A) from a key-value (KV) pair (e.g., key-value pair 301 in FIG. 3A). The controller may be configured to read, based on the first key, a first entry (e.g., entry 334 in FIG. 3A) of the hash table. The controller may be configured to read, based on the first entry of the hash table, a first page (e.g., metadata page 334 in FIG. 3A) including a set of KV hash entries (e.g., KV hash entry 391 and KV hash entry 392 in FIG. 3A) each containing a location of the non-volatile memory. The controller may be configured to determine whether the number of entries of the first page (e.g., metadata page 334 in FIG. 3A) reaches a predetermined number (e.g., a predefined metadata page size determined based on experimental determination or customer configuration). The controller may be configured to, in response to determining that the number of entries of the first page reaches the predetermined number, store KV data (e.g., value 405 stored the flash memory 280 in FIGS. 2 and 4) corresponding to the KV pair in a first location of the non-volatile memory (e.g., a location of the flash memory 280 in FIG. 2), write a first KV hash entry containing the first location of the non-volatile memory (e.g., KV hash entry 451 containing the address of the value 405 stored in the flash memory 280 in FIGS. 2 and 4), and write a location of the first KV hash entry (e.g., the address 457 in FIG. 4) in a second entry of the hash table (e.g., entry 438 in FIG. 4). The controller may be configured to, in response to determining that the number of entries of the first page does not reach the predetermined number, store KV data corresponding to the KV pair in a second location of the non-volatile memory (e.g., value 305 stored in a location of the flash memory 280 in FIGS. 2 and 3A), and add to the first page (e.g., metadata page 344 in FIG. 3A) a new KV hash entry containing the second location of the non-volatile memory (e.g., KV hash entry 392 containing the location of the value 305 stored in the flash memory 280 in FIGS. 2 and 3A). In some embodiments, each of the first entry (e.g., entry 334 in FIG. 3A) and the second entry (e.g., entry 438 in FIG. 4) of the hash table may contain a location of the non-volatile memory (e.g., a 4 byte address of non-volatile memory indicating a location of the metadata page 1 (344) in FIG. 3A or a location of the KV hash entry 451 in FIG. 4).

In some embodiments, in response to determining that the number of entries of the first page reaches the predetermined number, the controller may be configured to calculate, based on an index of the second entry of the hash table (e.g., entry 438 in FIG. 4), a redirection address (e.g., redirection address 442 in FIG. 4), and write the redirection address in a third entry of the hash table (e.g., entry 432 in FIG. 4). For example, the controller may calculate the redirection address 442 by adding the start address 468 to the offset 469 such that the offset 469 is half of the offset 452 of the entry 438 from the start address or index (e.g., the index 451 of the metadata map 430 in FIG. 4) of the overflow area 450. The redirection address (e.g., redirection address 442 in FIG. 4) may be within a redirection address space (e.g., the redirection address space 464 in FIG. 4) outside of an address space of the non-volatile memory (e.g., the flash address space 462 in FIG. 4).

In some embodiments, the controller may be configured to generate a first key (e.g., key 410 in FIG. 4) from the KV pair. The controller may be configured to read, based on the first key, the third entry of the hash table (e.g., entry 432 of metadata map 430 in FIG. 4). The controller may be configured to calculate, based on the third entry of the hash table (e.g., entry 432 in FIG. 4), the index of the second entry of the hash table (e.g., address or index 455 in FIG. 4). The controller may be configured to read, based on the second entry of the hash table (e.g., entry 438 in FIG. 4), the first KV hash entry (e.g., KV hash entry 451 at the address 457 in FIG. 4). The controller may be configured to read, based on the first KV hash entry, the KV data corresponding to the KV pair (e.g., value 405 stored in the flash memory 280 in FIGS. 2 and 4). In calculating the index (e.g., address or index 455 in FIG. 4) of the second entry of the hash table (e.g., entry 438 in FIG. 4), the controller may be configured to determine that an address contained in the third entry (e.g., address 442 contained in the entry 432 in FIG. 4) is within a redirection address space (e.g., redirection address space 464 in FIG. 4) outside of an address space of the non-volatile memory (e.g., flash address space 462 in FIG. 4), and in response to the determining that the address contained in the third entry (e.g., address 442 in FIG. 4) is within the redirection address space outside of the address space of the non-volatile memory, calculate, based on the address contained in the third entry, the index (e.g., index 455 in FIG. 4) of the second entry of the hash table (e.g., entry 438 in FIG. 4).

In some embodiments, the hash table may include a first set of entries in an address space of power of two (e.g., entries in the power of two area 440 in FIG. 4), and a second set of entries outside of the power of two address space (e.g., entries in the overflow area 450 in FIG. 4). The first set of entries may include the first entry of the hash table (e.g., entry 334 of the metadata map 330 in FIG. 3A). The second set of entries may include the second entry of the hash table (e.g., entry 438 in FIG. 4). The number of the second set of entries may be less than the number of the first set of entries (e.g., the number of entries in the overflow area 450 is 10% of the number of entries in the power of two area 440). The controller may be configured to determine the number of the second set of entries based on a tail distribution (e.g., tail portion 101 in FIG. 1) of the number of entries in a page including a set of KV hash entries.

In some embodiments, the controller may be configured to generate the first key (e.g., key 310 in FIG. 3A) from the KV pair (e.g., key-value pair 301 in FIG. 3A). The controller may be configured to read, based on the first key, the first entry of the hash table (e.g., entry 334 in FIG. 3A). The controller may be configured to read, based on the first entry of the hash table, the first page (e.g., metadata page 344 in FIG. 3A). The controller may be configured to read, based on the first page, the KV data corresponding to the KV pair (e.g., value 305 stored in the flash memory 280 in FIGS. 2 and 3A).

Figure 5A:
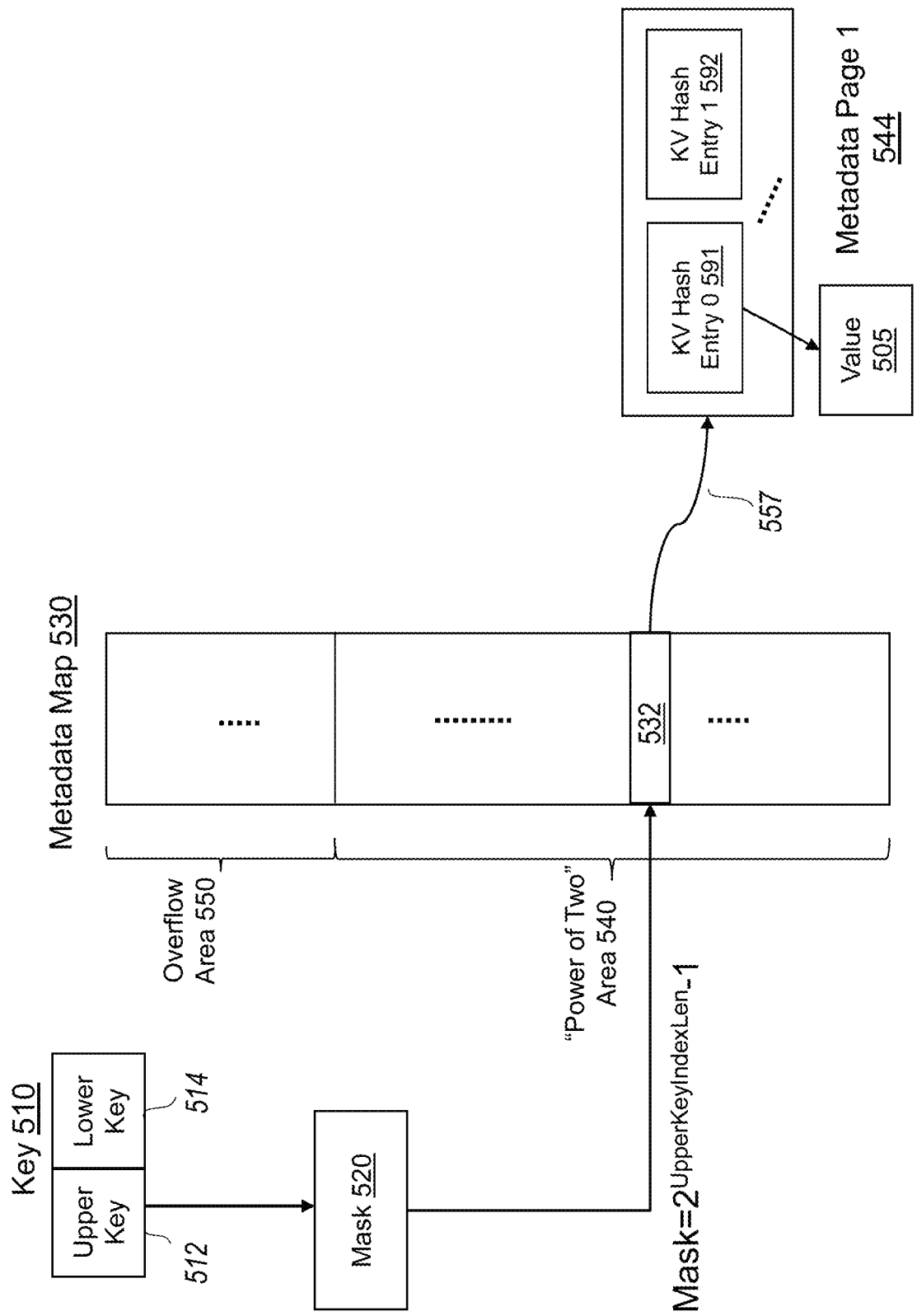
FIG. 5A, FIG. 5B and FIG. 5C illustrate another example process of performing a redirection in a hash table, according to some embodiments.
Figure 5B:
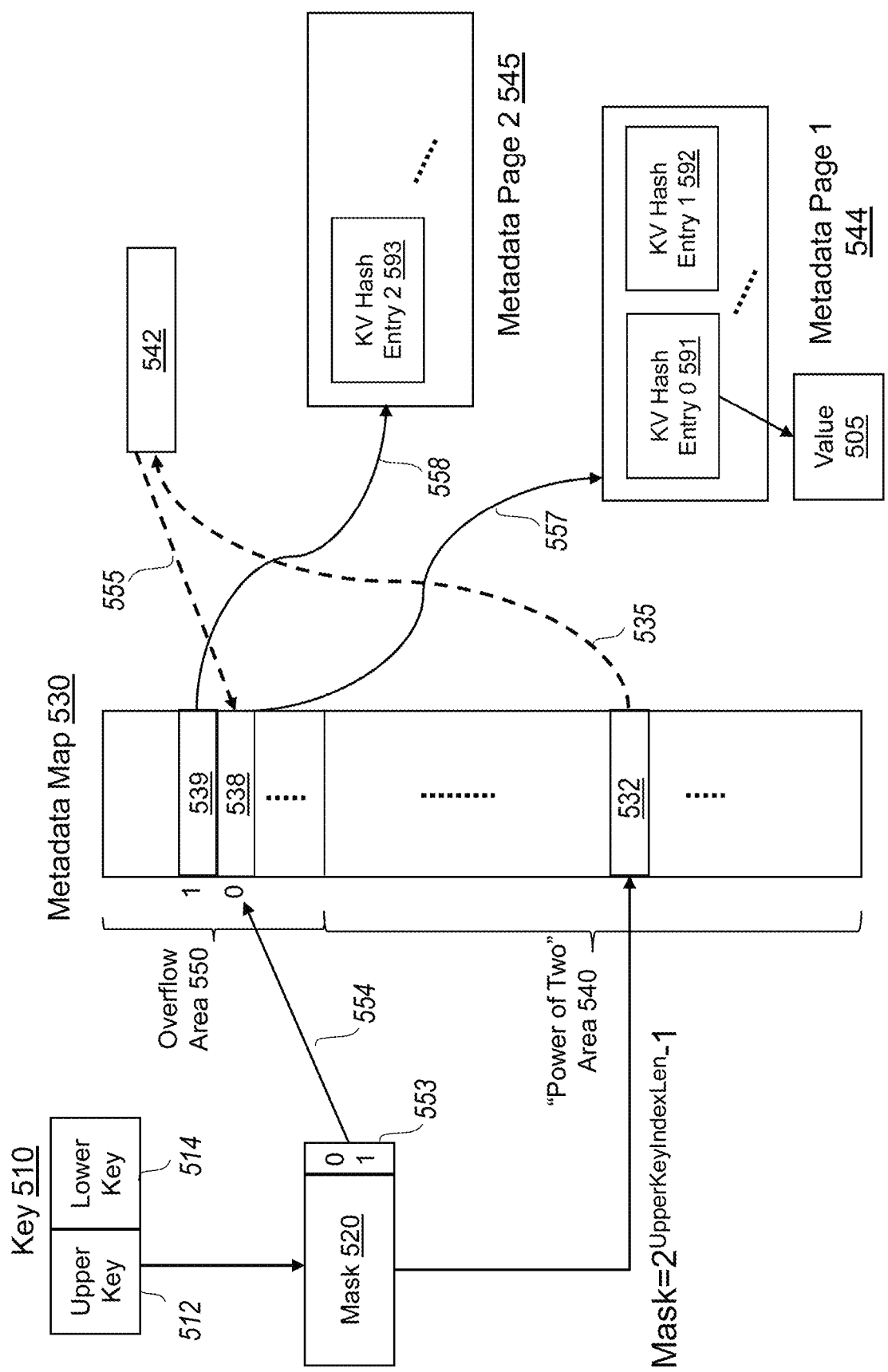
Figure 5C:
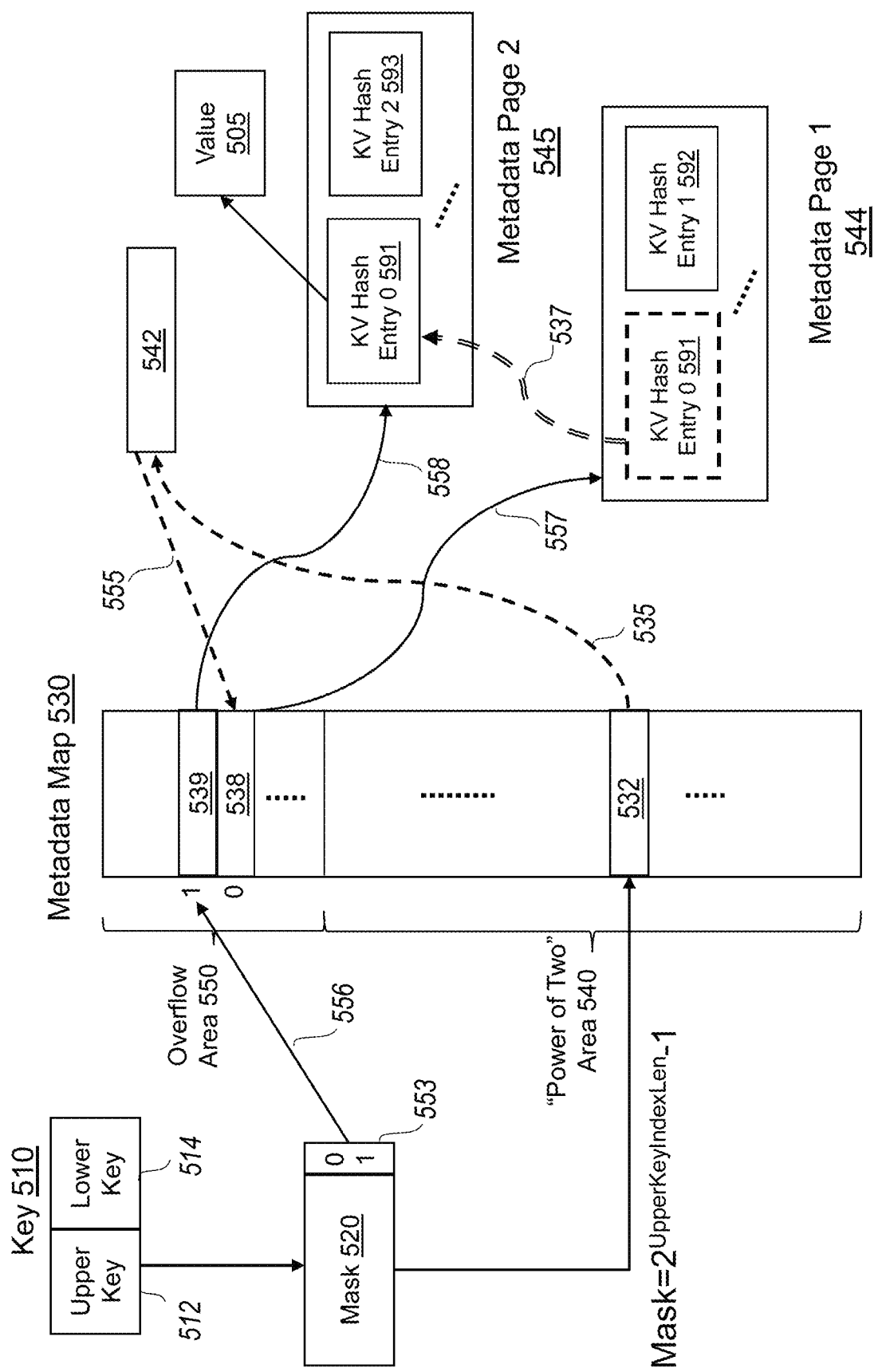

FIG. 5A, FIG. 5B and FIG. 5C illustrate another example process of performing a redirection in a hash table, according to some embodiments.

In some embodiments, when an address in the metadata map points into the redirection address space (e.g., the address contained in the entry 432 points into the redirection address space 464; see FIG. 4), the next lower significant bit of the upper key (e.g., the upper key 412 in FIG. 4) which is the most significant bit (MSB) of the lower key (e.g., the lower key 414 in FIG. 4) may be used to select one of two entries pointed to by a redirection reference (e.g., two entries 438, 439 pointed by the reference 455; see FIG. 4). This will be described in more detail with reference to FIG. 5A, FIG. 5B and FIG. 5C.

Referring to FIG. 5A, in some embodiments, a metadata map 530 as a KV hash table may have an extra overflow area 550 outside an area of power of two 540 to allow overflow of the KV hash table. Due to limited volatile memory space (e.g. DRAM 230 in FIG. 2) the power of two area 540 may be constrained in size by a maximum power of 2 value, as the space occupied by the metadata map 530 may be constrained to less than twice the corresponding maximum size of the power of two area 540. However, additional space may yet be available for an overflow area 550 which is less than the maximum size of the power of two area 540. Hence, the map contained within the power of two area 540 may be expanded without necessarily doubling the size of the power of two area 540. A fixed length key 510 may be generated from a user key corresponding to a value 505, and may be variably split into an upper key 512 and a lower key 514. The upper key 512 may be masked by a mask 520 to generate an index to an entry 532 of the metadata map 530. The entry 532 may contain an address 557 indicating a location of a metadata page 544 in a flash address space (e.g., the flash address space 462 in FIG. 4). The metadata page 544 may contain a KV hash entry 0 (591), a KV hash entry 1 (592), etc, and the KV hash entry 591 may contain an address and length of the value 505 stored in the non-volatile memory.

FIG. 5B shows an example implementation of flash memory mapping arrangement when a flash memory system splits the KV hash entries of the metadata page 1 (544). Referring to FIG. 5B, in some embodiments, when the length of the upper key (UpperKeyIndexLen) is N and a new hash entry is added (e.g., a KV hash entry 2 (593)), the flash memory system may split the KV hash entries of the metadata page 1 (544) as shown in FIG. 5A between the metadata page 544 (as shown in FIG. 5B) and a new metadata page 2 (545). After the flash memory system splits the KV hash entries of the metadata page 1 (544), the entry 532 may contain an address 542 indicating an address of a redirection address space (e.g., the redirection address space 464 in FIG. 4) so as to perform a redirection 535. The flash memory system may determine a reference 555 based on the address 542 in a manner similar to that of determining the reference 455 in FIG. 4. The reference 455 may be an index of the metadata map 530 pointing to two (2) entries 538, 539 in the overflow area 550 of the metadata map such that the entry 538 contains a flash memory address 557 of the metadata page 1 (544) and the entry 539 contains a flash memory address 558 of the metadata page 2 (545). In some embodiments, in splitting the KV hash entries of the metadata page 1 (544), the flash memory system may determine whether each KV hash entry of the metadata page 1 (including the new entry 593) is kept in page 1 444 or moved depending on a next significant bit of the upper key of the entry. For example, as shown in FIG. 5B, for the new entry 593, the flash memory system may determine that a next significant bit of the upper key of the entry 593 (i.e., $(N+1)^{th}$ bit of the upper key of the entry 593) is one (1) and store the entry 593 in the new metadata page 545, while the system may determine that a next significant bit of the upper key of the entry 591 is zero (0) and keep the entry 591 in the metadata page 1. If all KV hash entries of the metadata page 1 as well as the new entry 593 have the same value (e.g., 0) of the next significant bit (e.g., $(N+1)^{th}$ bit), which would be unlikely while possible, the flash memory may proceed to split the KV hash entries again on the basis of a value of the next significant bit, e.g., $(N+2)^{th}$ bit.

With this mapping arrangement as shown in FIG. 5B after the splitting is performed, the flash memory system may use the fixed length key 510 to access the corresponding value 505 as follows. The flash memory system may read the address of the entry 532 using the upper key with the current UpperKeyIndexLen=N, and determine, based on the address 542 contained in the entry 532, the two metadata map entries 538, 539 in the overflow area 550 of the metadata map 530. Next, the flash memory system may determine whether a next significant bit 553 of the upper key 512, i.e., $(N+1)^{th}$ bit of the key 510, is zero (0) or one (1). Because the flash memory system determines (554) that the next significant bit 553 is zero, the flash memory system may read the entry 538 (instead of the entry 539). The flash memory system may locate the KV hash entry 591 based on the address 557 contained in the entry 538, and further read the value 505 at the address contained in the entry 591.

FIG. 5C shows another example implementation of flash memory mapping arrangement when a flash memory system splits the KV hash entries of the metadata page 1 (544). Referring to FIG. 5C, in some embodiments, in splitting the KV hash entries of the metadata page 1 (544), the flash memory system may determine whether each KV hash entry of the metadata page 1 (including the new entry 593) is kept in page 1 444 or moved depending on a next significant bit of the upper key of the entry. For example, for the existing entry 591 of the metadata page 1 (544), the flash memory system may determine that the next significant bit of the upper key of the entry 591 (i.e., $(N+1)^{th}$ bit of the upper key of the entry 591) is one (1) and move (537) the entry 591 from the existing metadata page 544 to the new metadata page 545. With this mapping arrangement as shown in FIG. 5C after the splitting is performed, the flash memory system may use the fixed length key 510 to access the corresponding value 505 as follows. The flash memory system may read the address of the entry 532 using the upper key with the current UpperKeyIndexLen=N, and determine, based on the address 542 contained in the entry 532, the two metadata map entries 538, 539 in the overflow area 550 of the metadata map 530. Next, the flash memory system may determine whether a next significant bit 553 of the upper key 512, i.e., (N+1)$^{th}$ bit of the key 510, is zero (0) or one (1). Because the flash memory system determines (556) that the next significant bit 553 is one, the flash memory system may read the entry 539 (instead of the entry 538). The flash memory system may locate the KV hash entry 591 based on the address 558 contained in the entry 539, and further read the value 505 at the address contained in the entry 591.

Figure 6B:
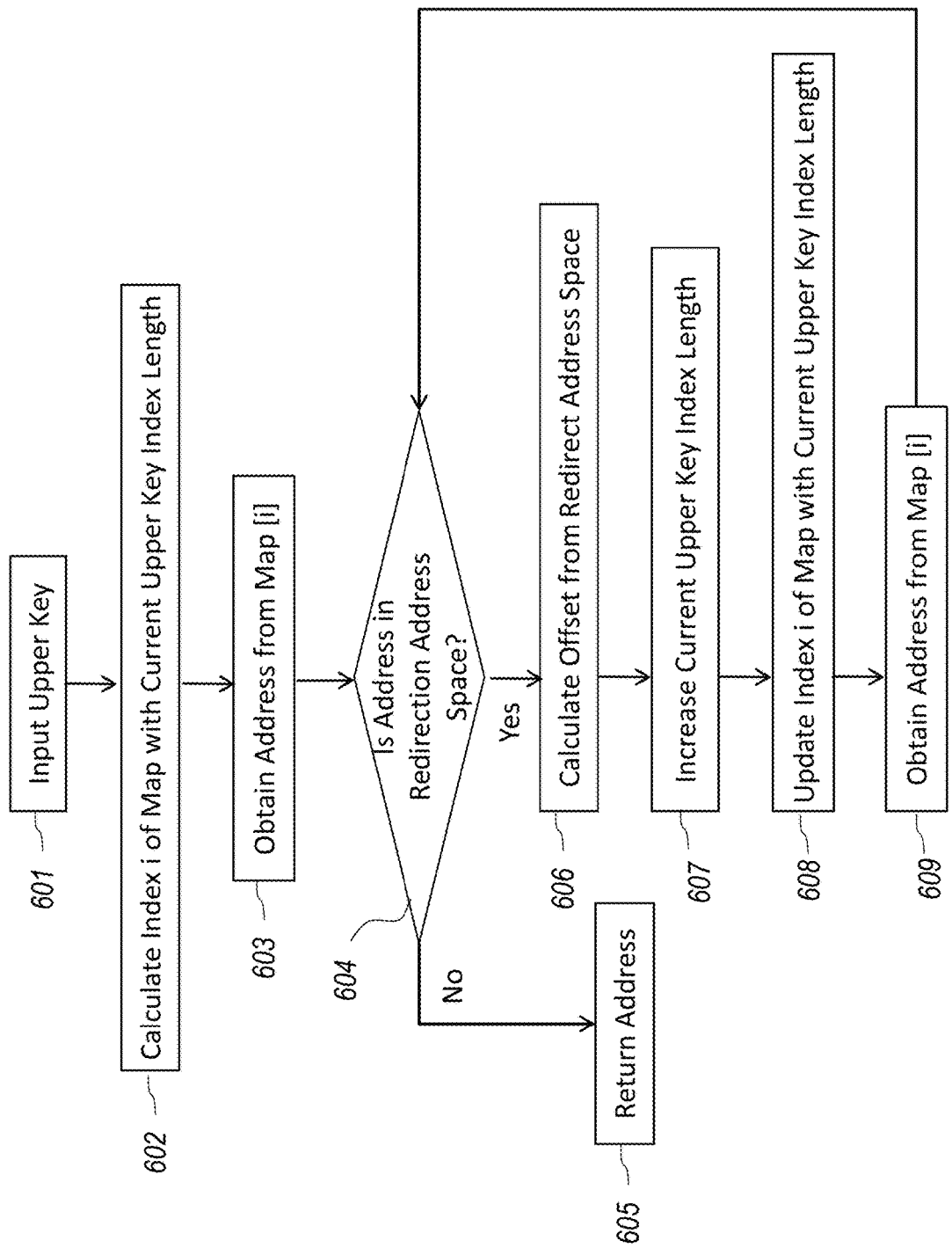
FIG. 6B is a flowchart illustrating an example methodology for calculating a redirected address using a hash tables, according to some embodiments.

FIG. 6A illustrates an example pseudo code for calculating a redirected address using a hash table, according to some embodiments. FIG. 6B is a flowchart illustrating an example methodology for calculating a redirected address using a hash table, according to some embodiments. The flowchart of FIG. 6B is consistent with the pseudo code of FIG. 6A.

Referring to FIG. 6B, in this example, the process begins in S501 by inputting, by a processor (e.g., the processor 250 in FIG. 2), an upper key of a key (e.g., the upper key 412 of the key 410) from a key-value (KV) pair.

In S602, in some embodiments, the processor may calculate an index i of a hash table (e.g., the metadata map 430 in FIG. 4) using a mask (e.g., the mask 420 in FIG. 4) with a current upper key index length (e.g., UpperKeyIndexLen=30).

In S603, in some embodiments, the processor may obtain an address (e.g., the address 442 in FIG. 4) from an entry (e.g., the entry 432 in FIG. 4) of the metadata map 430 pointed to by the index i.

In S604, in some embodiments, the processor may determine whether the obtained address (e.g., the address 442) is within a redirection address space (e.g., the redirection address space 464 in FIG. 4).

In S605, in some embodiments, in response to determination that the obtained address is not within a redirection address space, the processor may return the obtained address as an address of a flash address space (e.g., the flash address space 462 in FIG. 4).

In S606, in some embodiments, in response to determination that the obtained address (e.g., the address 442) is within a redirection address space (e.g., the redirection address space 464 in FIG. 4), the processor may calculate an offset (e.g., the offset 459) of the address (e.g., the address 442) from a start address of the redirection address space (e.g., the start address 468 in FIG. 4).

In S607, in some embodiments, the processor may increase the length of an upper key index (UpperKeyIndexLen) so that the next key bit of the key 410 can be used.

In S608, in some embodiments, the processor may update the index i of the metadata map 430 with a redirection reference (e.g., the reference 455 in FIG. 4) by adding an offset (e.g., the offset 452 in FIG. 4) to a start address (e.g., the address or index 451 in FIG. 4) of an overflow area (e.g., the overflow area 450 in FIG. 4) of the metadata map 430. In some embodiments, the offset 452 may be two times of the offset 469 so that the redirection reference 455 may point to two entries 438, 439 of the metadata map 430.

In S609, in some embodiments, the processor may obtain a redirected address (e.g., the address 457 in FIG. 4) by reading one of two entries (e.g., one of the two entries 438, 439 in FIG. 4) of the metadata map 430 pointed to by the updated index i using the current UpperKeyIndexLen (which has been increased in S607). For example, if the next key bit of the key 410 is zero (0), the processor may read the entry 438 of the two entries 438, 439. Otherwise, if the next key bit of the key 410 is one (1), the processor may read the entry 439.

Next, the processor may go to the S604 to determine whether the redirected address contained in the entry read (e.g., the entry 438 in FIG. 4) is within a redirection address space. In response to determination that the redirected address is still within a redirection address space (e.g., the redirection address space 464 in FIG. 4), the processor may obtain a new redirected address in the next iteration.

Figure 7:
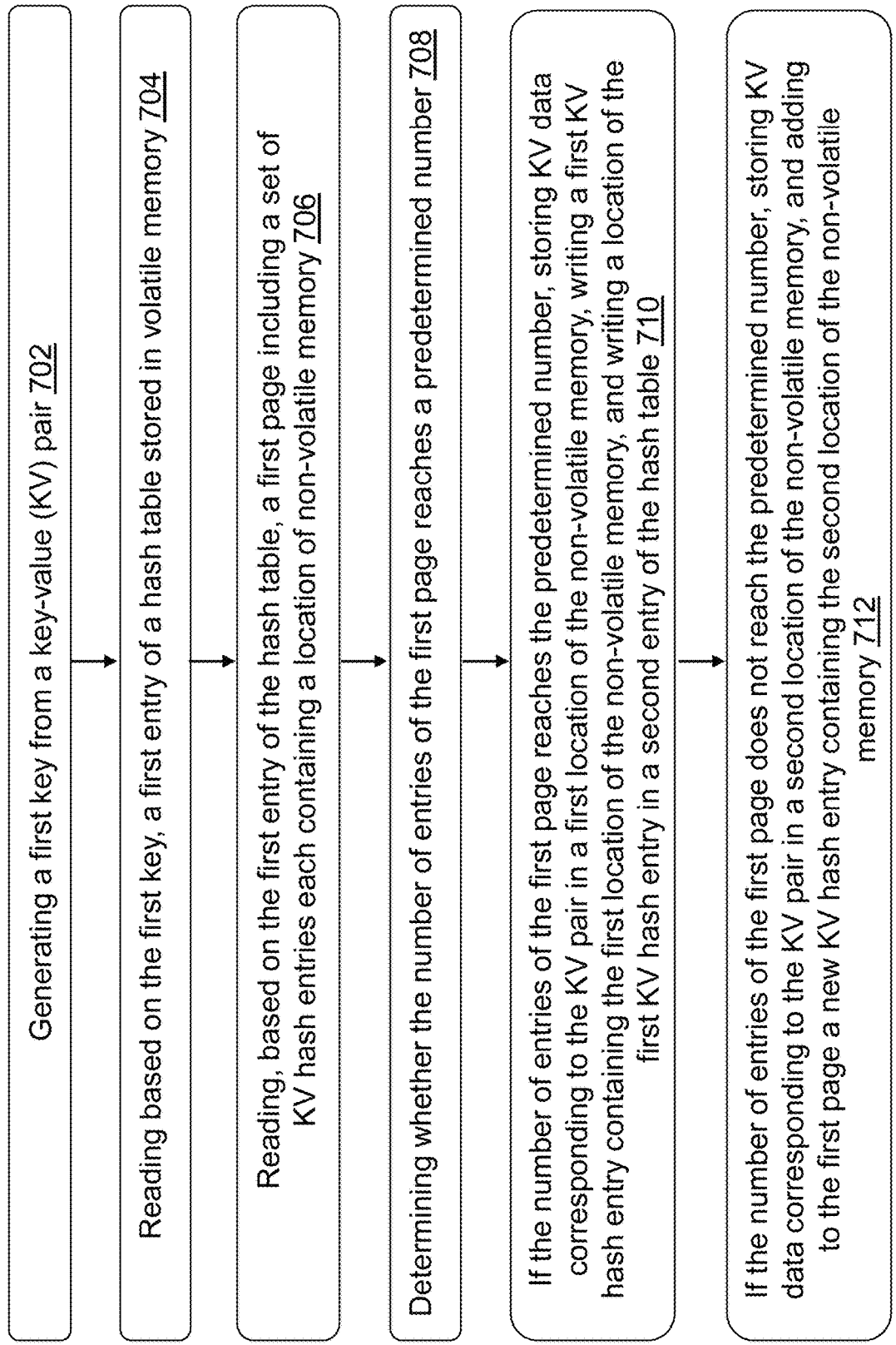
FIG. 7 is a flowchart illustrating an example methodology for storing key-value (KV) data in non-volatile memory using a hash table, according to some embodiments.

FIG. 7 is a flowchart illustrating an example methodology for storing key-value (KV) data in non-volatile memory using a hash table, according to some embodiments. In this example, the process begins in S702 by generating, by a processor (e.g., the processor 250 of the controller 220 in FIG. 2), a first key (e.g., key 310 in FIG. 3A) from a key-value (KV) pair (e.g., key-value pair 301 in FIG. 3A).

In S704, in some embodiments, the processor may read, based on the first key (e.g., key 310 in FIG. 3A), a first entry (e.g., entry 334 in FIG. 3A) of a hash table (e.g., metadata map 330, 430 in FIGS. 3A and 4) stored in volatile memory (e.g., DRAM 210 in FIG. 2). In some embodiments, the first entry of the hash table (e.g., entry 334 in FIG. 3A) may contain a location of the non-volatile memory (e.g., a 4 byte address of non-volatile memory indicating a location of the metadata page 1 (344) in FIG. 3A).

In S706, in some embodiments, the processor may read, based on the first entry of the hash table (e.g., entry 334 in FIG. 3A), a first page (e.g., entry 334 in FIG. 3A) including a set of KV hash entries (e.g., KV hash entry 391 and KV hash entry 392 in FIG. 3A) each containing a location of non-volatile memory.

In S708, in some embodiments, the processor may determine whether the number of entries of the first page (e.g., metadata page 334 in FIG. 3A) reaches a predetermined number (e.g., a predefined metadata page size determined based on experimental determination or customer configuration).

In S710, in some embodiments, in response to determining that the number of entries of the first page reaches the predetermined number, the processor may store KV data (e.g., value 405 stored the flash memory 280 in FIGS. 2 and 4) corresponding to the KV pair in a first location of the non-volatile memory (e.g., a location of the flash memory 280 in FIG. 2), write a first KV hash entry containing the first location of the non-volatile memory (e.g., KV hash entry 451 containing the address of the value 405 stored in the flash memory 280 in FIGS. 2 and 4), and write a location of the first KV hash entry (e.g., the address 457 in FIG. 4) in a second entry of the hash table (e.g., entry 438 in FIG. 4). In some embodiments, the second entry of the hash table (e.g., entry 438 in FIG. 4) may contain a location of the non-volatile memory (e.g., a 4 byte address of non-volatile memory indicating a location of the KV hash entry 451 in FIG. 4).

In some embodiments, in response to determining that the number of entries of the first page reaches the predetermined number, the processor may calculate, based on an index of the second entry of the hash table (e.g., entry 438 in FIG. 4), a redirection address (e.g., redirection address 442 in FIG. 4). The processor may write the redirection address in a third entry of the hash table (e.g., entry 432 in FIG. 4). For example, the processor may calculate the redirection address 442 by adding the start address 468 to the offset 469 such that the offset 469 is half of the offset 452 of the entry 438 from the start address or index (e.g., the index 451 of the metadata map 430 in FIG. 4) of the overflow area 450. In some embodiments, the redirection address (e.g., redirection address 442 in FIG. 4) may be within a redirection address space (e.g., the redirection address space 464 in FIG. 4) outside of an address space of the non-volatile memory (e.g., the flash address space 462 in FIG. 4).

In S712, in some embodiments, in response to determining that the number of entries of the first page does not reach the predetermined number, the processor may store KV data corresponding to the KV pair in a second location of the non-volatile memory (e.g., value 305 stored in a location of the flash memory 280 in FIGS. 2 and 3A), and add to the first page (e.g., metadata page 344 in FIG. 3A) a new KV hash entry containing the second location of the non-volatile memory (e.g., KV hash entry 392 containing the location of the value 305 stored in the flash memory 280 in FIGS. 2 and 3A).

In some embodiments, the hash table may include a first set of entries in an address space of power of two (e.g., entries in the power of two area 440 in FIG. 4), and a second set of entries outside of the power of two address space (e.g., entries in the overflow area 450 in FIG. 4). The first set of entries may include the first entry of the hash table (e.g., entry 334 of the metadata map 330 in FIG. 3A). The second set of entries may include the second entry of the hash table (e.g., entry 438 in FIG. 4). The number of the second set of entries may be less than the number of the first set of entries (e.g., the number of entries in the overflow area 450 is 10% of the number of entries in the power of two area 440). The method may include determining the number of the second set of entries based on a tail distribution (e.g., tail portion 101 in FIG. 1) of the number of entries in a page including a set of KV hash entries.

Figure 8:
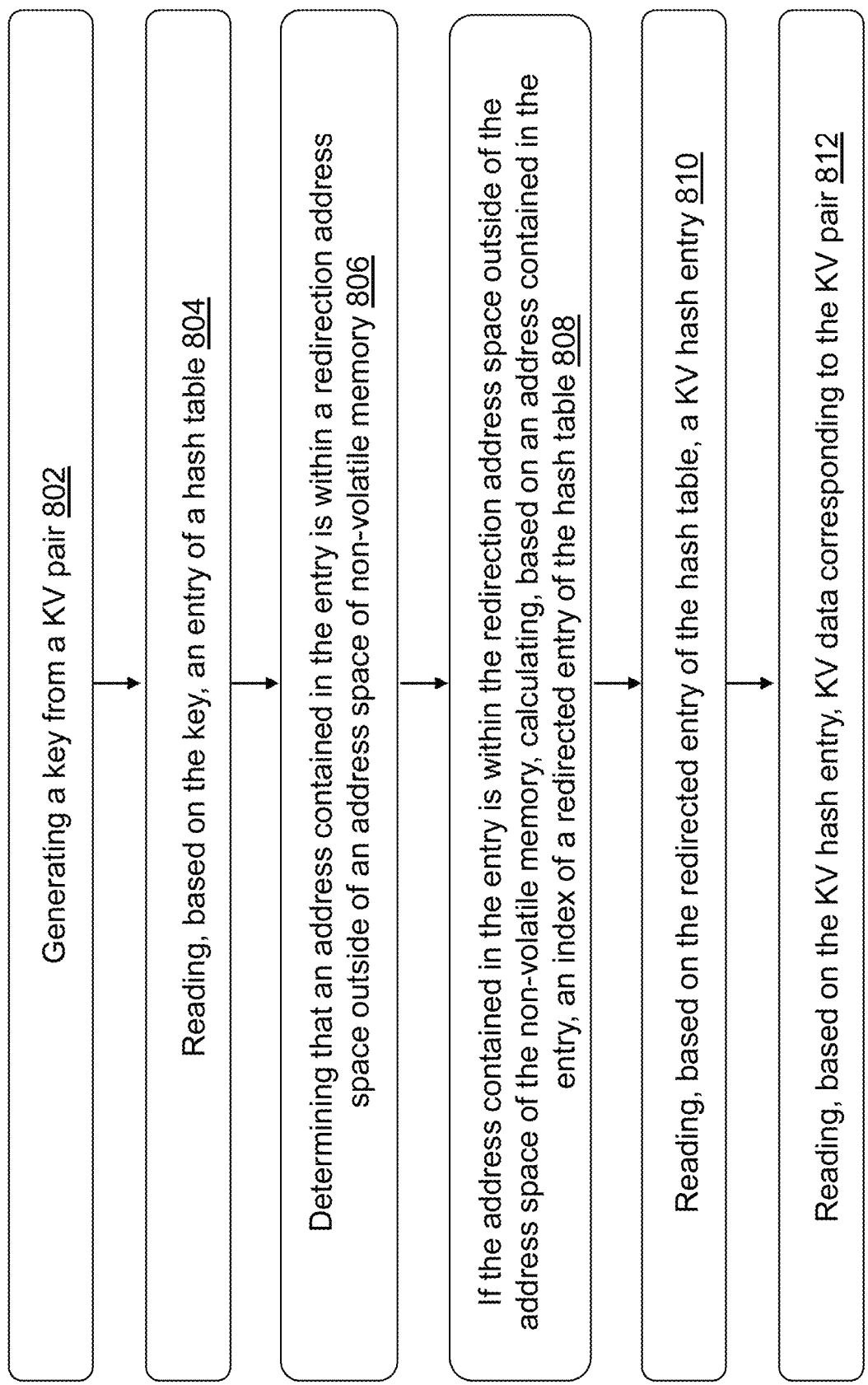
FIG. 8 is a flowchart illustrating an example methodology for reading KV data in non-volatile memory using a hash table, according to some embodiments.

FIG. 8 is a flowchart illustrating an example methodology for reading KV data in non-volatile memory using a hash table, according to some embodiments. In this example, the process begins in S802 by generating a key (e.g., key 410 in FIG. 4) from a KV pair which may be provided by the user as part of request.

In S804, in some embodiments, the processor may read, based on the first key, an entry of the hash table (e.g., entry 432 of metadata map 430 in FIG. 4).

In S806, in some embodiments, the processor may determine that an address contained in the entry (e.g., address 442 contained in the entry 432 in FIG. 4) is within a redirection address space (e.g., redirection address space 464 in FIG. 4) outside of an address space of the non-volatile memory (e.g., flash address space 462 in FIG. 4).

In S808, in some embodiments, in response to the determining that the address contained in the entry (e.g., address 442 contained in the entry 432 in FIG. 4) is within the redirection address space outside of the address space of the non-volatile memory, the processor may calculate, based on the address contained in the entry, the index of a redirected entry of the hash table (e.g., address or index 455 in FIG. 4).

In S810, in some embodiments, the processor may read, based on the redirected entry of the hash table (e.g., entry 438 in FIG. 4), a KV hash entry (e.g., KV hash entry 451 at the address 457 in FIG. 4).

In S812, in some embodiments, the processor may read, based on the KV hash entry (e.g., KV hash entry 451 at the address 457 in FIG. 4), KV data corresponding to the KV pair (e.g., value 405 stored in the flash memory 280 in FIGS. 2 and 4).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A device for managing key-value (KV) data in non-volatile memory, comprising:
    a controller; and
    volatile memory storing a hash table,
    wherein the controller is configured to:
        generate a first key from a key-value (KV) pair;
        read, based on the first key, a first entry of the hash table, wherein the first entry is located in a non-overflow portion of the hash table;
        read, based on the first entry of the hash table, a first page including a set of KV hash entries, each KV hash entry of the set of KV hash entries containing a length of KV data and an address of the KV data in the non-volatile memory;
        determine whether a number of KV hash entries of the first page reaches a predetermined number;
        in response to determining that the number of KV hash entries of the first page reaches the predetermined number, store KV data corresponding to the KV pair in a first location of the non-volatile memory, write a first KV hash entry containing the first location of the non-volatile memory as the address in the first KV hash entry, and write a location of the first KV hash entry in a second entry of the hash table, wherein the second entry is located in an overflow portion of the hash table that has a size that is less than the non-overflow portion of the hash table, and wherein the location of the first KV hash entry written in the second entry of the hash table corresponds to a second page of KV hash entries that is separate from the first page of KV hash entries; and
        in response to determining that the number of KV hash entries of the first page does not reach the predetermined number, store KV data corresponding to the KV pair in a second location of the non-volatile memory, and add to the set of KV hash entries in the first page a new KV hash entry containing the second location of the non-volatile memory as the address in the new KV hash entry.

2. The device of claim 1, wherein each of the first page and the second page are located in the non-volatile memory.

3. The device of claim 1, wherein in response to determining that the number of entries of the first page reaches the predetermined number, the controller is configured to:
    calculate, based on an index of the second entry of the hash table, a redirection address; and
    write the redirection address in a third entry of the hash table.

4. The device of claim 3, wherein the redirection address is within a redirection address space outside of an address space of the non-volatile memory.

5. The device of claim 3, wherein the controller is configured to:
    read, based on the first key, the third entry of the hash table;
    calculate, based on the third entry of the hash table, the index of the second entry of the hash table;
    read, based on the second entry of the hash table, the first KV hash entry; and
    read, based on the first KV hash entry, the KV data corresponding to the KV pair.

6. The device of claim 5, wherein in calculating the index of the second entry of the hash table, the controller is configured to:
    determine that an address contained in the third entry is within a redirection address space outside of an address space of the non-volatile memory; and in response to the determining that the address contained in the third entry is within the redirection address space outside of the address space of the non-volatile memory, calculate, based on the address contained in the third entry, the index of the second entry of the hash table.

7. The device of claim 1, wherein
the non-overflow portion of the hash table comprises a first set of entries in an address space of power of two, and the overflow portion of the hash table comprises a second set of entries outside of the power of two address space,
the first set of entries includes the first entry of the hash table, and
the second set of entries includes the second entry of the hash table.

8. The device of claim 7, wherein the number of the second set of entries is less than the number of the first set of entries.

9. The device of claim 7, wherein the controller is configured to determine the number of the second set of entries based on a tail distribution of the number of entries in a page including a set of KV hash entries.

10. The device of claim 1, wherein the controller is configured to:
generate the first key from the KV pair;
read, based on the first key, the first entry of the hash table;
read, based on the first entry of the hash table, the first page; and
read, based on the first page, the KV data corresponding to the KV pair.

11. A method of managing key-value (KV) data in non-volatile memory, comprising:
generating, by a processor, a first key from a key-value (KV) pair;
reading, by the processor based on the first key, a first entry of a hash table stored in volatile memory, wherein the first entry is located in a non-overflow portion of the hash table;
reading, by the processor based on the first entry of the hash table, a first page including a set of KV hash entries, each KV hash entry of the set of KV hash entries containing a length of KV data and an address of the KV data in the non-volatile memory;
determining, by the processor, whether a number of KV hash entries of the first page reaches a predetermined number;
in response to determining that the number of KV hash entries of the first page reaches the predetermined number, storing, by the processor, KV data corresponding to the KV pair in a first location of the non-volatile memory, writing a first KV hash entry containing the first location of the non-volatile memory as the address in the first KV hash entry, and writing a location of the first KV hash entry in a second entry of the hash table, wherein the second entry is located in an overflow portion of the hash table that has a size that is less than the non-overflow portion of the hash table, and wherein the location of the first KV hash entry written in the second entry of the hash table corresponds to a second page of KV hash entries that is separate from the first page of KV hash entries; and
in response to determining that the number of KV hash entries of the first page does not reach the predetermined number, storing, by the processor, KV data corresponding to the KV pair in a second location of the non-volatile memory, and adding to the set of KV hash entries in the first page a new KV hash entry containing the second location of the non-volatile memory as the address in the new KV hash entry.

12. The method of claim 11, wherein each of the first page and the second page are located in the non-volatile memory.

13. The method of claim 11, further comprising:
in response to determining that the number of entries of the first page reaches the predetermined number,
calculating, based on an index of the second entry of the hash table, a redirection address; and
writing the redirection address in a third entry of the hash table.

14. The method of claim 13, wherein the redirection address is within a redirection address space outside of an address space of the non-volatile memory.

15. The method of claim 13, further comprising:
reading, based on the first key, the third entry of the hash table;
calculating, based on the third entry of the hash table, the index of the second entry of the hash table;
reading, based on the second entry of the hash table, the first KV hash entry; and
reading, based on the first KV hash entry, the KV data corresponding to the KV pair.

16. The method of claim 15, wherein calculating the index of the second entry of the hash table comprises:
determining that an address contained in the third entry is within a redirection address space outside of an address space of the non-volatile memory; and
in response to the determining that the address contained in the third entry is within the redirection address space outside of the address space of the non-volatile memory, calculating, based on the address contained in the third entry, the index of the second entry of the hash table.

17. The method of claim 11, wherein
the non-overflow portion of the hash table comprises a first set of entries in an address space of power of two, and the overflow portion of the hash table comprises a second set of entries outside of the power of two address space,
the first set of entries includes the first entry of the hash table, and
the second set of entries includes the second entry of the hash table.

18. The method of claim 17, further comprising:
determining the number of the second set of entries based on a tail distribution of the number of entries in a page including a set of KV hash entries.

19. The method of claim 11, further comprising:
generating the first key from the KV pair;
reading, based on the first key, the first entry of the hash table;
reading, based on the first entry of the hash table, the first page; and
reading, based on the first page, the KV data corresponding to the KV pair.

20. The device of claim 1, wherein in response to determining that the number of entries of the first page reaches the predetermined number, the controller is configured to add a redirection address to the hash table by which both the first page and the second page can be accessed.

* * * * *